(12) United States Patent
Kita

(10) Patent No.: US 9,630,665 B2
(45) Date of Patent: Apr. 25, 2017

(54) CRAWLER BELT COUPLING APPARATUS

(71) Applicant: KOMATSU LTD., Tokyo (JP)

(72) Inventor: Naoaki Kita, Hirakata (JP)

(73) Assignee: KOMATSU LTD., Tokyo (JP)

(*) Notice: Subject to any disclaimer, the term of this patent is extended or adjusted under 35 U.S.C. 154(b) by 346 days.

(21) Appl. No.: 14/376,882

(22) PCT Filed: Aug. 21, 2013

(86) PCT No.: PCT/JP2013/072246
§ 371 (c)(1),
(2) Date: Aug. 6, 2014

(87) PCT Pub. No.: WO2014/136290
PCT Pub. Date: Sep. 12, 2014

(65) Prior Publication Data
US 2016/0221619 A1    Aug. 4, 2016

(30) Foreign Application Priority Data

Mar. 6, 2013  (JP) .................... 2013-043880

(51) Int. Cl.
| | | |
|---|---|---|
| *B62D 55/21* | (2006.01) | |
| *B62D 55/28* | (2006.01) | |
| *B62D 55/06* | (2006.01) | |
| *E02F 3/32* | (2006.01) | |
| *E02F 9/02* | (2006.01) | |

(52) U.S. Cl.
CPC .......... *B62D 55/213* (2013.01); *B62D 55/21* (2013.01); *B62D 55/06* (2013.01); *B62D 55/28* (2013.01); *E02F 3/32* (2013.01); *E02F 9/02* (2013.01)

(58) Field of Classification Search
CPC ..... B62D 55/21; B62D 55/211; B62D 55/213
See application file for complete search history.

(56) References Cited

U.S. PATENT DOCUMENTS 1,983,548 A * 12/1934 Knox .................. B62D 55/205
                                                              305/164
2,430,573 A * 11/1947 Krotz ................. B62D 55/0887
                                                              305/42
(Continued)

FOREIGN PATENT DOCUMENTS

CN       101947982 A      1/2011
CN       102414076 A      4/2012
(Continued)

*Primary Examiner* — Kip T Kotter
(74) *Attorney, Agent, or Firm* — Drinker Biddle & Reath LLP

(57) ABSTRACT

A crawler belt coupling apparatus includes a first crawler belt link, a second crawler belt link, a master pin, a locking pin, and a snap ring. The master pin is inserted in first and second through holes. The master pin is provided with an insertion hole. The locking pin is press fitted into the insertion hole, and has both ends projecting relative to the master pin. The snap ring has a C-like shape, has an outer diameter larger than the first through hole, is disposed opposite to the second crawler belt link relative to the first through hole, and is attached to the master pin. The groove has a width smaller than a diameter of the master pin. The locking pin is disposed in the groove.

6 Claims, 10 Drawing Sheets

(56) References Cited

U.S. PATENT DOCUMENTS

| | | | | |
|---|---|---|---|---|
| 2,988,926 | A | * | 6/1961 | Mazzarins ............ B62D 55/213 305/202 |
| 3,013,844 | A | * | 12/1961 | Mazzarins ............ B62D 55/213 305/142 |
| 3,027,201 | A | * | 3/1962 | Blazek ................ B62D 55/213 305/186 |
| 3,169,039 | A | * | 2/1965 | Baker ................. B62D 55/213 305/186 |
| 4,150,856 | A | * | 4/1979 | Hakkenberg ....... B62D 55/0887 305/106 |
| 4,277,199 | A | * | 7/1981 | Livesay ............ B62D 55/0887 403/317 |
| 6,926,460 | B2 | * | 8/2005 | Yamamoto ............ B62D 55/21 305/204 |
| 2008/0073972 | A1 | | 3/2008 | Mulligan et al. |
| 2008/0265667 | A1 | * | 10/2008 | Livesay ................. B62D 55/21 305/202 |
| 2010/0090523 | A1 | * | 4/2010 | Grenzi .................. B62D 55/21 305/104 |
| 2012/0056472 | A1 | | 3/2012 | Grenzi |
| 2012/0112526 | A1 | | 5/2012 | Miller |

FOREIGN PATENT DOCUMENTS

| | | |
|---|---|---|
| CN | 102427994 A | 4/2012 |
| JP | S48-009444 Y | 3/1973 |
| JP | S52-092115 A | 8/1977 |
| JP | S54-093641 U | 7/1979 |
| JP | S58-190277 U | 12/1983 |
| JP | S58-190278 U | 12/1983 |
| JP | S61-184178 A | 8/1986 |
| JP | S62-016394 Y2 | 4/1987 |
| JP | S64-001078 U | 1/1989 |
| JP | H3-064839 B2 | 10/1991 |
| JP | H06-041265 B2 | 6/1994 |
| JP | H08-295268 A | 11/1996 |
| JP | 2008-074391 A | 4/2008 |
| JP | 2012-521326 A | 9/2012 |
| JP | 2012-521327 A | 9/2012 |

* cited by examiner

CRAWLER BELT COUPLING APPARATUS

TECHNICAL FIELD

The present invention relates to a crawler belt coupling apparatus, in particular, a crawler belt coupling apparatus including a master pin.

BACKGROUND ART

A hydraulic excavator, a bulldozer, and the like, each of which includes a crawler belt, have been known as work vehicles. The crawler belt includes a belt-like crawler belt link chain in which a plurality of crawler belt links are coupled to one another. By coupling crawler belt links at the ends of the belt-like crawler belt link chain to each other, an endless crawler belt is obtained. The endless crawler belt is wound around a traveling apparatus. The traveling apparatus includes a driving wheel, an idler tumbler, a track frame, and the like. As an apparatus for coupling the end portions of the crawler belt link chain to each other, a special crawler belt pin or a special crawler belt link is used. The former is called a "master pin", and the latter is called a "master link". The crawler belt may be detached/attached from/to the traveling apparatus in order to exchange wear-out parts or the like. When detaching/attaching the crawler belt from/to the traveling apparatus, the crawler belt link chain needs to be decoupled/coupled.

In the case where the master pin is used as the coupling apparatus, the master pin needs to be detached/attached to/from the crawler belt link so as to decouple/couple the crawler belt link chain. In general, the master pin is press fitted into a through hole of the crawler belt link. Hence, for the detachment/attachment of the master pin, a pressing machine is required. Thus, such a pressing machine is required to detach/attach the crawler belt from/to the traveling apparatus in a work site for the work vehicle. Accordingly, time and effort are required to prepare the pressing machine in the operation of detaching/attaching the crawler belt in the work site. This results in poor workability.

In order to save the time and effort, for example, Japanese Utility Model Laying-Open No. 64-1078 (Patent Document 1) proposes an apparatus permitting detachment/attachment of a master pin from/to a crawler belt link and including a retaining pin to prevent the master pin from coming off from the crawler belt link. In this structure, the retaining pin is withdrawn/inserted to detach/attach the master pin from/to the crawler belt link without using a pressing machine.

In addition, in this apparatus, a brim is provided at one end of the master pin and the retaining pin is inserted into the other end thereof. Further, the crawler belt link is provided with a locking boss, which is engaged with the brim of the master pin. With the engagement between the brim of the master pin and the locking boss of the crawler belt link, the master pin can be suppressed from being turned according to the crawler belt link.

CITATION LIST

Patent Document

PTD 1: Japanese Utility Model Laying-Open No. 64-1078

SUMMARY OF INVENTION

Technical Problem

When the crawler belt of the apparatus described in the above-described publication is used, the corner portion of the brim of the master pin is brought into contact with the locking boss of the crawler belt link, with the results that the locking boss is worn out. This provides a large space between the locking boss of the crawler belt and the brim of the master pin. Accordingly, the master pin is turned according to the crawler belt link. Moreover, the master pin is likely to come off from the crawler belt link.

The present invention has been made in view of the foregoing problem, and has an object to provide a crawler belt coupling apparatus capable of improving workability in detaching/attaching a crawler belt and capable of avoiding the master pin from falling off from the crawler belt link.

Solution To Problem

A crawler belt coupling apparatus of the present invention includes a first crawler belt link, a second crawler belt link, a master pin, a locking pin, and a snap ring. The first crawler belt link has a first through hole. The second crawler belt link is disposed to face the first crawler belt link, has a second through hole, and has a groove formed in an end surface thereof opposite to the first crawler belt link. The master pin is inserted into the first and second through holes. The master pin is provided with an insertion hole radially extending through the master pin. The locking pin is press fitted into the insertion hole and has both ends projecting relative to the master pin. The snap ring has a C-like shape, has an outer diameter larger than the first through hole, is disposed opposite to the second crawler belt link relative to the first through hole, and is attached to the master pin. The groove has a width smaller than a diameter of the master pin. The locking pin is disposed in the groove.

According to the crawler belt coupling apparatus of the present invention, the snap ring has the C-like shape, so that the snap ring can be readily detached/attached from/to the master pin. By detaching/attaching the snap ring, the master pin can be detached/attached from/to the first and second crawler belt links. Accordingly, the master pin can be detached/attached from/to the first and second crawler belt links without using a pressing machine. In this way, workability can be improved in detaching/attaching the crawler belt.

Further, the locking pin is press fitted into the insertion hole formed in the master pin, and has both the ends projecting relative to the master pin. The groove is formed in the end surface of the second crawler belt link opposite to the first crawler belt link, and has a width smaller than the diameter of the master pin. Because the locking pin is disposed in the groove, the locking pin is brought into abutment with the groove when the master pin is rotated, thereby preventing rotation of the master pin. In this way, the master pin can be prevented from being rotated about the second crawler belt link. Accordingly, the master pin can be avoided from falling off from the second crawler belt link.

Further, the groove has a width smaller than the diameter of the master pin, so that the link boss portion of the second crawler belt link can be formed to be thick around the groove. This leads to suppression of wear of the link boss portion. In this way, the master pin can be prevented from being rotated about the second crawler belt link.

In the above-described crawler belt coupling apparatus, the master pin is engaged with the first and second through holes through intermediate fit. Accordingly, the master pin can be detached/attached from/to the first and second crawler belt links without using a pressing machine.

In the above-described crawler belt coupling apparatus, the locking pin has a cylindrical shape, and the groove has an arc-like bottom surface in conformity with the cylindrical shape. Accordingly, the locking pin can be in surface contact with the bottom surface of the groove. This suppresses the groove from being worn by contact with the locking pin. In this way, the master pin can be avoided from falling off from the second crawler belt link.

In the above-described crawler belt coupling apparatus, the locking pin has a center portion having a diameter smaller than a diameter of each of both side portions thereof sandwiching the center portion therebetween. Accordingly, while both the side portions are press fitted into the insertion hole, a space can be formed between the center portion and the inner circumferential surface of the insertion hole. This reduces contact resistance between the locking pin and the insertion hole, thereby facilitating insertion of the locking pin into the insertion hole.

In the above-described crawler belt coupling apparatus, the locking pin is disposed at a center of the groove in a length direction. Accordingly, the rocking pin can be unlikely to come off from both the sides of the groove in the length direction.

In the above-described crawler belt coupling apparatus, the second crawler belt link includes a tread and a link boss portion. The groove is formed in the link boss portion in parallel with the tread. In this way, the groove can be provided with a long length. Accordingly, the locking pin, which is disposed in the groove, can be also made long. In this way, there can be obtained a large area in which the locking pin and the groove are in abutment with each other, thereby further suppressing rotation of the locking pin.

Advantageous Effects of Invention

As described above, according to the present invention, workability can be improved in detaching/attaching the crawler belt and the master pin can be avoided from falling off from the crawler belt link.

DESCRIPTION OF EMBODIMENTS

The following describes an embodiment of the present invention based on figures.

Described first is a configuration of a hydraulic excavator in one embodiment of the present invention. In the description below, the hydraulic excavator will be described as one exemplary track-laying work vehicle to which a concept of the present invention can be applied. However, the present invention can be also applied to a track-laying work vehicle other than the hydraulic excavator, such as a bulldozer.

Figure 1:
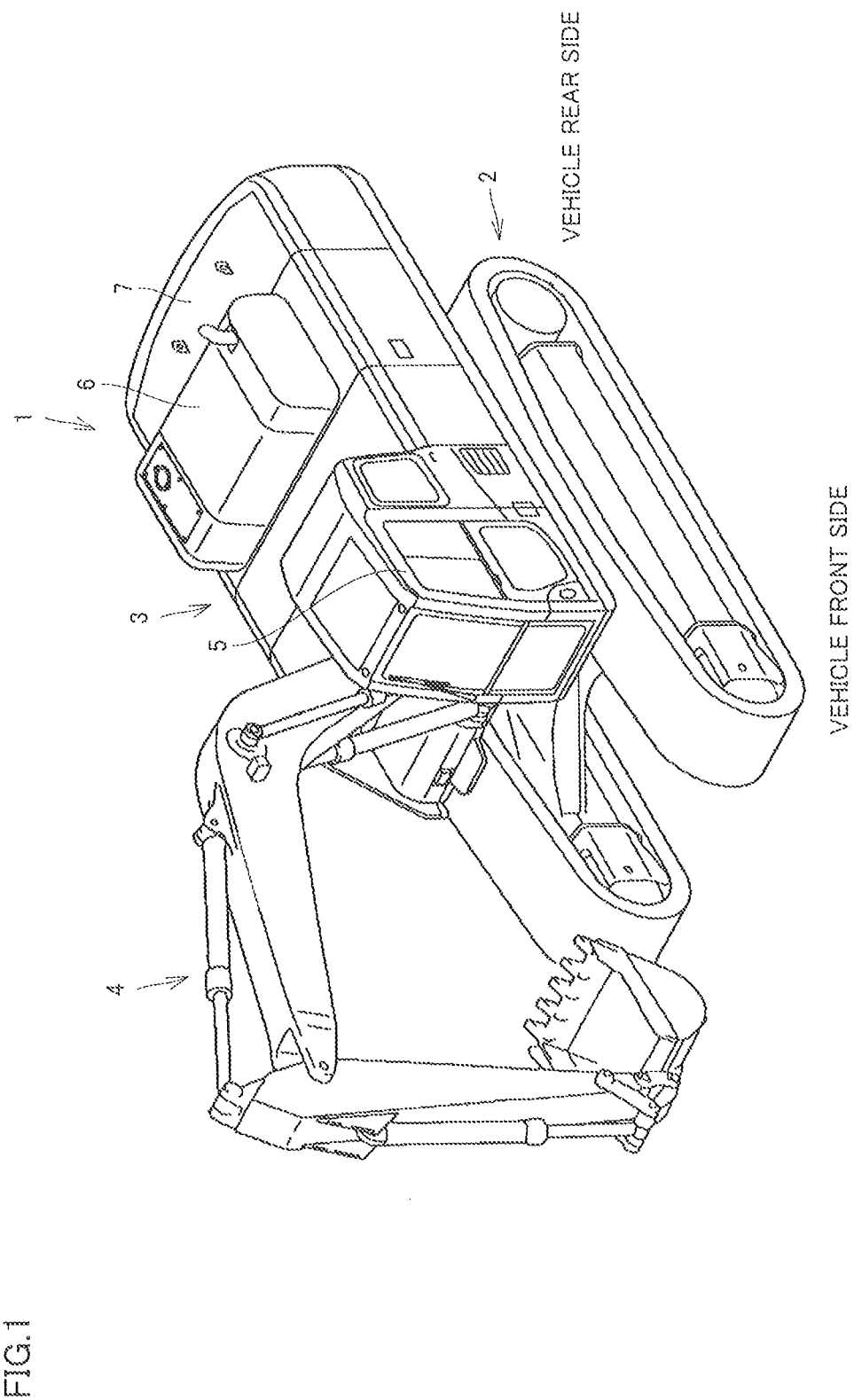
FIG. 1 is a perspective view schematically showing a configuration of a hydraulic excavator in one embodiment of the present invention.

Referring to FIG. 1, hydraulic excavator 1 mainly includes a lower traveling unit 2, an upper revolving unit 3, and a work implement 4. Lower traveling unit 2 is configured to be capable of traveling autonomously as described below in detail. Upper revolving unit 3 is installed rotatable about lower traveling unit 2. Work. implement 4 is pivotably arranged at the front side of upper revolving unit 3 to move up/down. This work implement 4 includes a boom, an arm, a bucket, hydraulic cylinders, and the like, for example.

Lower traveling unit 2 and upper revolving unit 3 mainly form the work vehicle main body. Upper revolving unit 3 includes a cab 5 at the front left side (vehicle front side). At the rear side (vehicle rear side), upper revolving unit 3 includes an engine compartment 6 having an engine contained therein, and a counter weight 7. Here, the front, rear, left, and right sides of the vehicle are defined on the basis of the operator who sits in cab 5.

Figure 2:
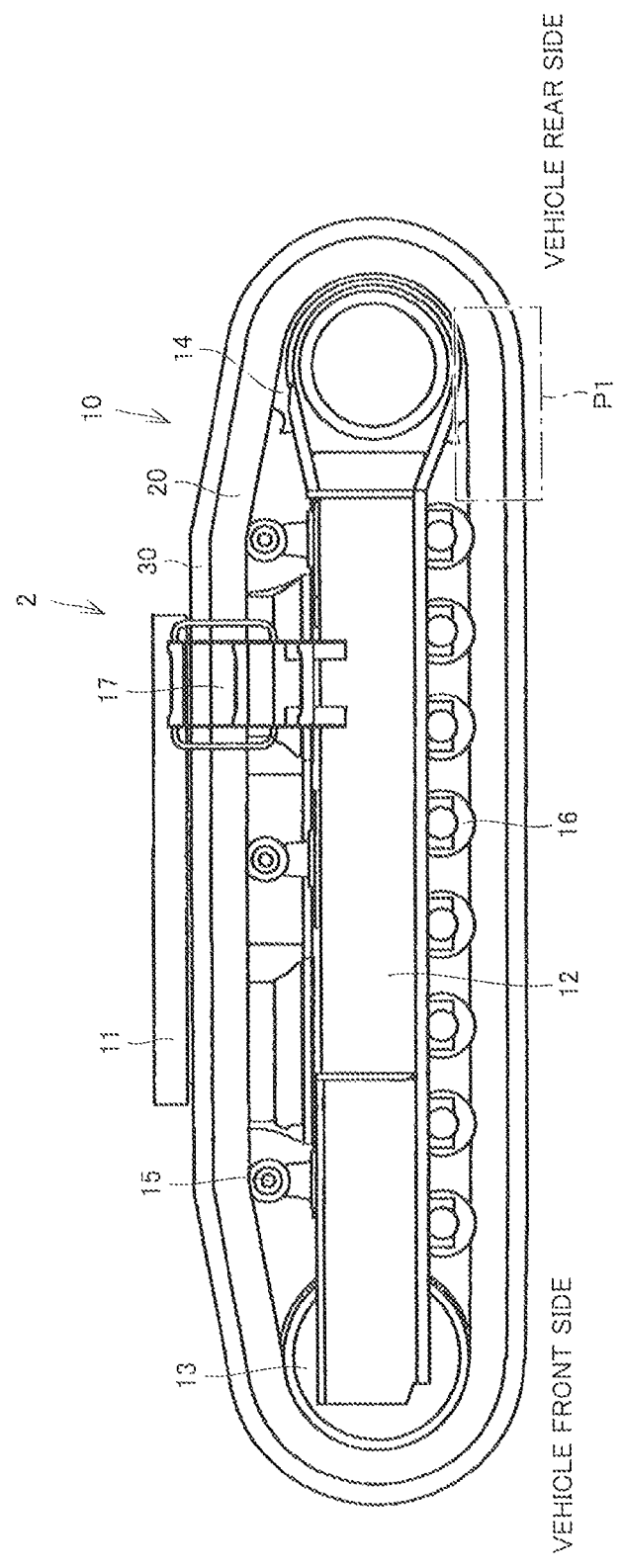
FIG. 2 is a side view schematically showing a configuration of a lower traveling unit of the hydraulic excavator in one embodiment of the present invention.

Referring to FIG. 2, lower traveling unit 2 is configured such that hydraulic excavator 1 travels when a pair of crawler belts 10 disposed at the left and right sides are driven to rotate. Lower traveling unit 2 mainly includes crawler belts 10, a revolving apparatus 11, track frames 12, idler tumblers (idler rollers) 13, driving wheels (sprocket wheels) 14, carrier rollers 15, and track rollers 16.

Each of crawler belts 10 includes a crawler belt link chain 20, and track shoe plates 30 attached to crawler belt link chain 20. Revolving apparatus 11 is configured to be capable of revolving upper revolving unit 3 (FIG. 1), and is provided across the upper end portion of lower traveling unit 2 and the lower end portion of upper revolving unit 3. Track frames 12 are provided at both the ends of a center frame serving as a mount for revolving apparatus 11, so as to extend in the forward/backward direction of the vehicle.

Idler tumbler 13 is rotatably provided at the front end portion of track frame 12, and driving wheel 14 is provided at the rear end portion of track frame 12 so as to be driven and rotatable. The plurality of carrier rollers 15 are provided at the upper surface side of track frame 12, and the plurality of track rollers 16 are provided at the lower surface side of track frame 12.

Crawler belt 10 is wound around idler tumbler 13 and driving wheel 14. Further, crawler belt 10 is supported by carrier rollers 15 and track rollers 16 disposed between idler tumbler 13 and driving wheel 14. When crawler belt link chain 20 is engaged with driving wheel 14 and is driven, track shoe plate 30 is driven to rotate. Accordingly, crawler belt 10 is driven to rotate. In this way, lower traveling unit 2 autonomously travels.

Figure 3:
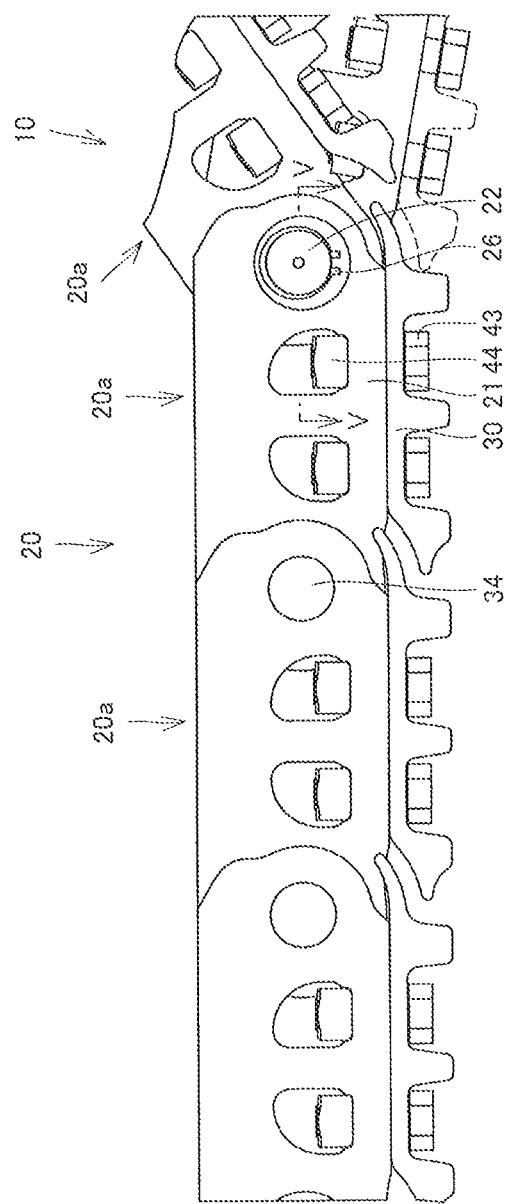
FIG. 3 is an enlarged view showing a crawler belt in a P1 portion in FIG. 2.

Referring to FIG. 3, crawler belt link chain 20 of crawler belt 10 is constructed by coupling a plurality of crawler belt links 20a into an endless shape. The plurality of crawler belt links 20a have ground engaging surface (outer surface) sides to which track shoe plates 30 are fixed. From the outer surface side of each of track shoe plates 30, bolts 43 are inserted into through holes provided in track shoe plate 30 and crawler belt link 20a. At the ground non-engaging surface (inner surface) side of crawler belt link 20a, nuts 44 are screwed onto the tip portions of bolts 43. By these bolts 43 and nuts 44, track shoe plate 30 is fixed to the outer end surface of crawler belt link 20a.

The plurality of crawler belt links 20a are pivotably supported by crawler belt pins 34 and are accordingly rotatably coupled to one another, thus forming crawler belt link chain 20 having a belt-like shape. Crawler belt links 20a disposed at both the ends of crawler belt link chain 20 having such a belt-like shape are coupled to each other using a pin designated as "master pin 22", thereby forming a chain having an endless shape.

Figure 4:
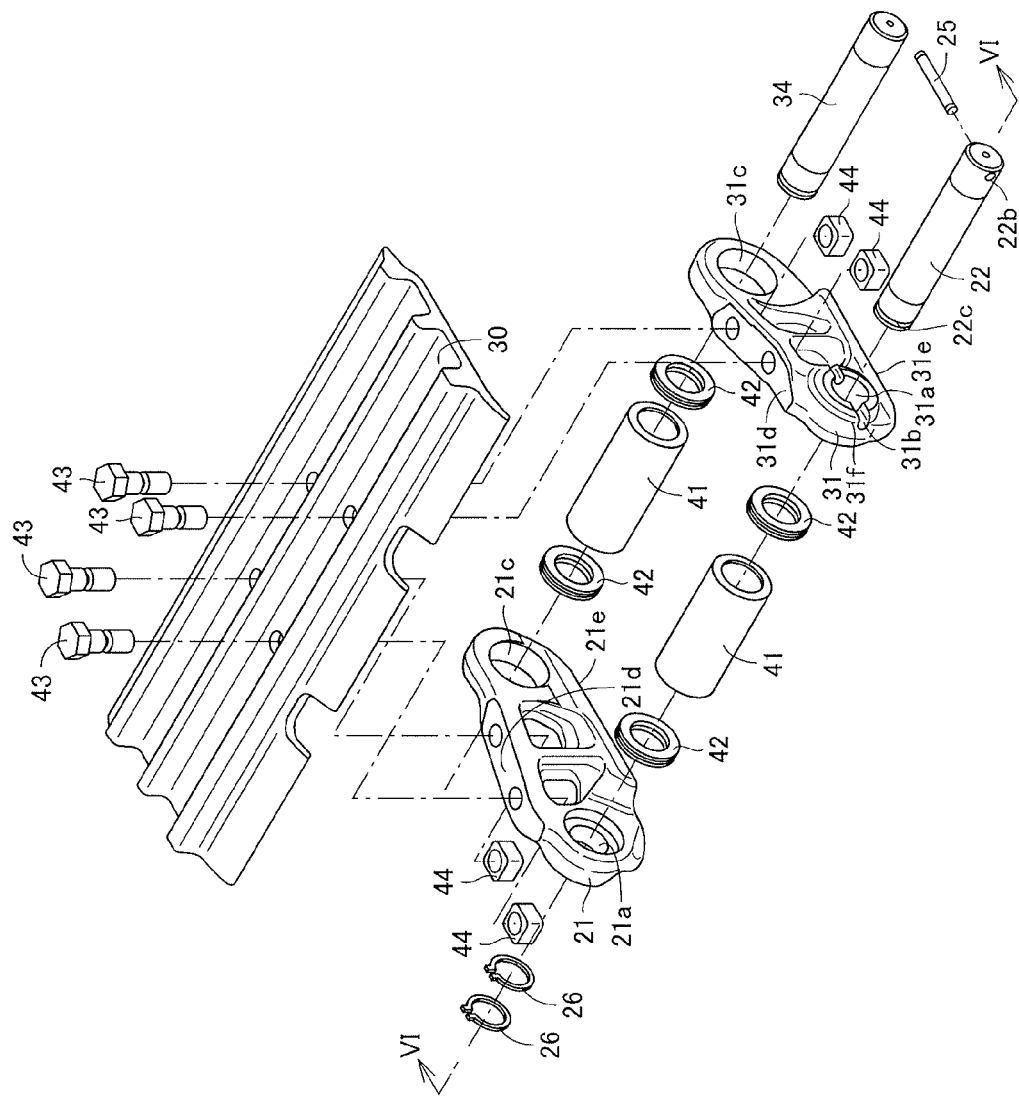
FIG. 4 is a partial exploded perspective view schematically showing a structure in surroundings of the crawler belt coupling apparatus in one embodiment of the present invention.

Referring to FIG. 3 and FIG. 4, a crawler belt coupling apparatus is an apparatus provided at a link of an end portion of crawler belt link chain 20 having the belt-like shape with an end, so as to couple both the ends of the crawler belt link chain to each other and accordingly obtain crawler belt link chain 20 having the endless shape. The crawler belt coupling apparatus of the present embodiment mainly includes a first crawler belt link 21, a second crawler belt link 31, a master pin 22, a locking pin 25, and snap rings 26.

One crawler belt link 20a in crawler belt link chain 20 is configured as a part of the crawler belt coupling apparatus, and has first crawler belt link 21 and second crawler belt link 31 constituting a pair. First crawler belt link 21 and second crawler belt link 31 are disposed in parallel with each other with a space interposed therebetween in a direction (crawler belt width direction) orthogonal to the coupling direction of crawler belt link. chain 20, Further, first crawler belt link 21 and second crawler belt link 31 are formed in substantially bilateral symmetry. In each of first and second crawler belt links 21, 22, the inner side is defined as a side facing the other crawler belt link of the pair and the outer side is defined as a side opposite thereto.

At one end side in the longitudinal direction, first crawler belt link 21 includes a first through hole 21a and second crawler belt link 31 includes a second through hole 31a. At the other end side, first crawler belt link 21 includes a third through hole 21c and second crawler belt link 31 includes a fourth through hole 31c. Second crawler belt link 31 is disposed to face first crawler belt link 21. Second crawler belt link 31 has a groove 31b formed in an end surface positioned opposite to first crawler belt link 21. The shape of this groove 31b will be described later.

Master pin 22 is installed between the one end portion of first crawler belt link 21 and the one end portion of second crawler belt link 31. Both the end portions of master pin 22 are respectively fixed into first and second through holes 21a, 31a. In other words, master pin 22 is inserted into first through hole 21a and second through hole 31a. First crawler belt link 21 is disposed at one end side of master pin 22, and second crawler belt link 31 is disposed at the other end side of master pin 22.

Figure 5:
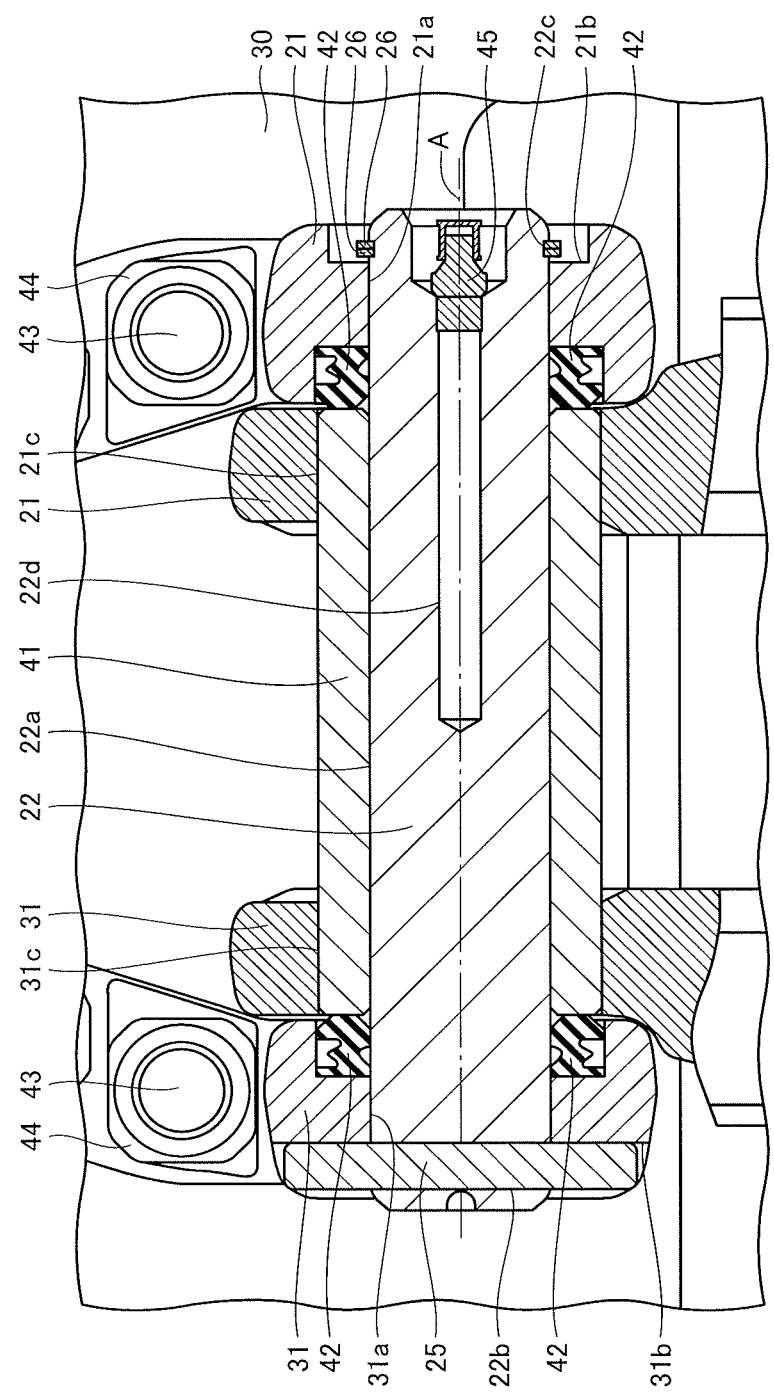
FIG. 5 is a partial cross sectional view taken along a line V-V of FIG. 3.

Master pin 22 is a component having a cylindrical shape with a center axis A (FIG. 5). Master pin 22 has an outer circumferential surface 22a having a circumferential groove 22c with which snap rings 26 are engaged. Because snap rings 26 are installed in circumferential groove 22c, snap rings 26 can be securely fixed at predetermined positions. In this way, master pin 22 can be prevented from falling off.

Master pin 22 is provided with an insertion hole 22b that is formed in the vicinity of one end portion thereof in the axis direction and that radially extends through master pin 22. Insertion hole 22b has a diameter smaller than the diameter of a portion, engaged with insertion hole 22b, of locking pin 25. Hence, locking pin 25 is press fitted into insertion hole 22b of master pin 22.

Locking pin 25 has a size longer than the diameter of master pin 22. Hence, when locking pin 25 is fixed to master pin 22, both the ends of locking pin 25 project relative to master pin 22. Locking pin 25 is fixed to master pin 22 to extend orthogonal to center axis A of master pin 22. Locking pin 25 has a cylindrical shape.

Each of snap rings 26 has a C-like shape. Snap ring 26 is annular and has a portion provided with a cutout. By widening this cutout, the diameter of snap ring 26 can be larger.

Referring to FIG. 4 and FIG. 5, snap ring 26 has an outer diameter larger than first through hole 21a. Snap ring 26 is positioned opposite to second crawler belt link 31 relative to first through hole 21a. Snap ring 26 is installed into circumferential groove 22c of master pin 22, and is attached to master pin 22. In other words, as shown in FIG. 3, when the crawler belt coupling apparatus is viewed outwardly of first crawler belt link 21, snap ring 26 overlaps with first through hole 21a. Namely, snap ring 26 prevents master pin 22 from coming off from first through hole 21a.

In the present embodiment, snap ring 26 is separated from end surface 21b of first crawler belt link 21 with a space interposed therebetween, but snap ring 26 may be in contact with end surface 21b of first crawler belt link 21. One or more snap rings 26 may be provided. In the present embodiment, two snap rings 26 are arranged side by side and are installed into circumferential groove 22c.

The one end portion of each of first crawler belt link 21 and second crawler belt link 31 is disposed outwardly of one adjacent crawler belt link 20a. Here, the term "outwardly" is intended to mean a direction getting away in the width direction of the crawler belt (leftward/rightward direction in FIG. 5) from the center of the crawler belt in the width direction thereof.

A crawler belt bushing 41 is disposed between the one end portion of first crawler belt link 21 and the one end portion of second crawler belt link 31. Crawler belt bushing 41 is rotatably fitted to master pin 22, externally. Crawler belt bushing 41 is fixed into third and fourth through holes 21c, 31c of one adjacent crawler belt link 20a. Accordingly, first crawler belt link 21, second crawler belt link 31, and the one adjacent crawler belt link 20a are rotatably coupled to one another via crawler belt bushing 41.

Further, crawler belt bushing 41 is formed to be engaged with teeth of driving wheel (sprocket wheel) 14. A seal ring 42 is disposed in a recess portion formed in the inner side surface of crawler belt link, 20a, in contact with the end surface of crawler belt bushing 41.

Further, a crawler belt pin 34 is installed between the other end portion of first crawler belt link 21 and the other end portion of second crawler belt link 31. The other end portion of each of first crawler belt link 21 and second crawler belt link 31 is disposed inwardly of the other adjacent crawler belt link 20a.

A crawler belt bushing 41 is disposed between the other end portion of first crawler belt link 21 and the other end portion of second crawler belt link 31. Crawler belt bushing 41 is rotatably fitted to crawler belt pin 34, externally.

Crawler belt bushing 41 is inserted and fixed into third through hole 21c of first crawler belt link 21 and fourth through hole 31c of second crawler belt link 31. Accordingly, first crawler belt link 21, second crawler belt link 31, and the other adjacent crawler belt link 20a are rotatably coupled to one another via crawler belt bushing 41.

It should be noted that the end portions of crawler belt pin 34 are press fitted into first and second through holes 21a, 31a of the other adjacent crawler belt link 20a, and are fixed thereto firmly through interference fit. For example, crawler belt pin 34 is press fitted into the other crawler belt link 20a at 160 kN (kilonewton). On the other hand, in the crawler belt coupling apparatus of the present embodiment, the end portions of master pin 22 are press fitted into through hole 21a of first crawler belt link 21 and through hole 31a of second crawler belt link 31 with a force weaker than that for crawler belt pin 34, and is engaged therewith through intermediate fit rather than interference fit.

Here, the term "intermediate fit" is intended to mean such fit that the maximum limit of size of the pin diameter of master pin 22 is larger than the minimum limit of size of the bore diameter of each of through holes 21a, 31a and the minimum limit of size of the pin diameter is smaller than the maximum limit of size of the bore diameter. The intermediate fit is also referred to as "transition fit". In other words, master pin 22 is fixed to such an extent that master pin 22 is made immovable by the fit between the outer circumferential surface of the pin and the inner circumferential surface of the through hole. For example, master pin 22 is press fitted into first and second crawler belt links 21, 31 at 16 kN.

Figure 6:
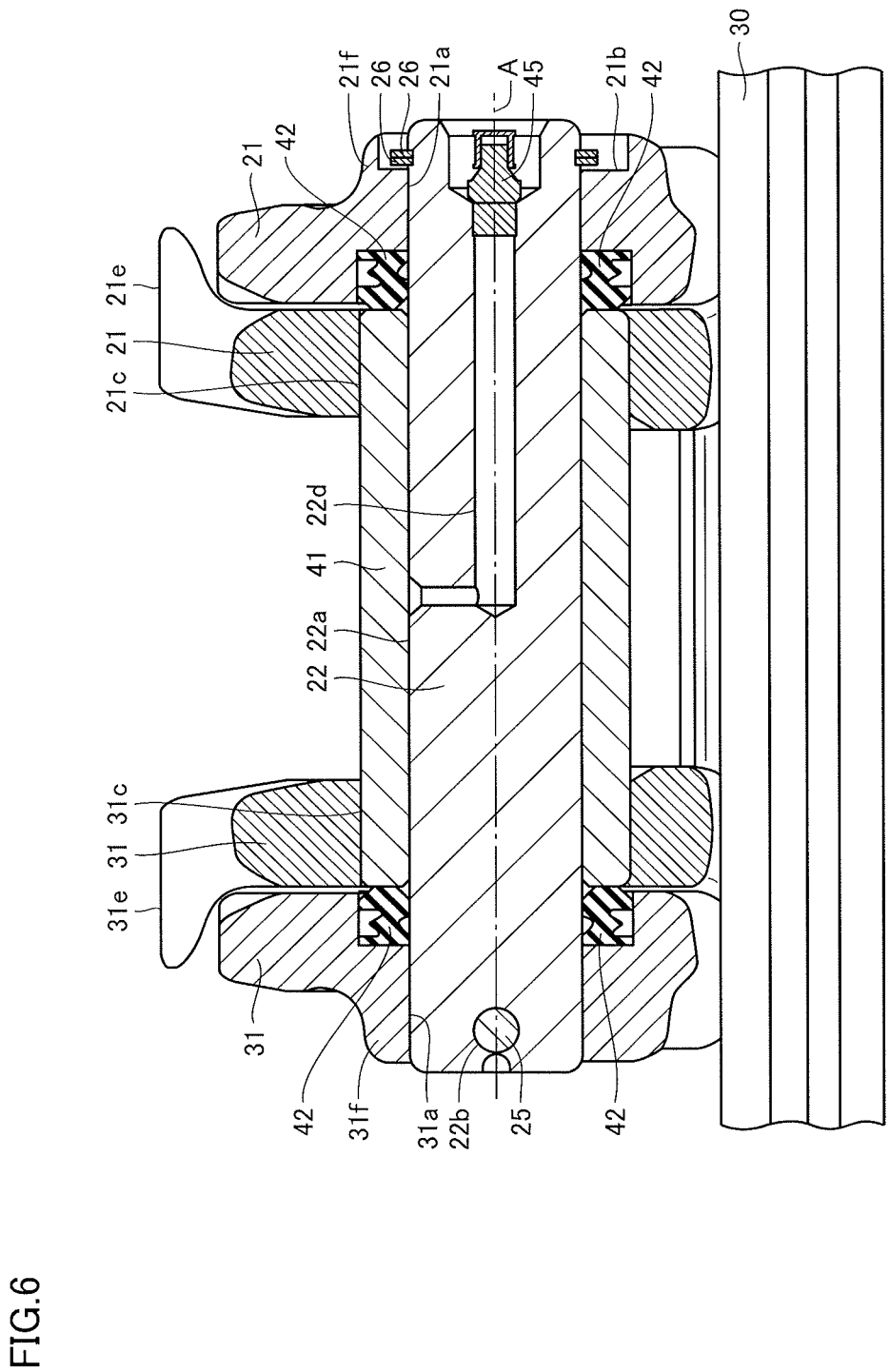
FIG. 6 is a cross sectional view taken along a line VI-VI of FIG. 4.

Referring to FIG. 4 and FIG. 6, first crawler belt link 21 includes a track shoe plate mounting surface 21d and second crawler belt link 31 includes a track shoe plate mounting surface 31d at the one end side in the short direction. First crawler belt link 21 includes a tread 21e and second crawler belt link 31 includes a tread 31e at their other end side. Track shoe plate mounting surface 21d and tread 21e of first crawler belt link 21 are disposed between the one end and the other end of first crawler belt link 21 in the longitudinal direction. Track shoe plate mounting surface 31d and tread 31e of second crawler belt link 31 are disposed between the one end and the other end of second crawler belt link 31 in the longitudinal direction.

Track shoe plate mounting surface 21d of first crawler belt link 21 and track shoe plate mounting surface 31d of second crawler belt link 21 are fixed to track shoe plate 30 by bolts 43 and nuts 44 shown in FIG. 4. Tread 21e of first crawler belt link 21 and tread 31e of second crawler belt link 31 are configured to be capable of being in abutment with carrier rollers 15 and track rollers 16 shown in FIG. 2. Further, first crawler belt link 21 and second crawler belt link 31 respectively have a link boss portion 21f and a link boss portion 31f opposite to (outwardly of) each other. Link boss portion 21f and link boss portion 31f are portions projecting from peripheries of the edges of first through hole 21a and second through hole 31a so as to reinforce the edges thereof.

Master pin 22 has a supply path 22d for supplying lubricating oil between master pin 22 and crawler belt bushing 41. Supply path 22d is formed along center axis A, and has an opening at its end surface facing the one end side of the master pin. Further, supply path 22d has a through hole communicating with outer circumferential surface 22a of master pin 22. Thus, the lubricating oil having been provided to the opening is supplied from the supply path to a space between master pin 22 and crawler belt bushing 41 via the through hole. Further, master pin 22 has a plug member 45 that can be placed into the opening of supply path 22d. After the lubricating oil is provided from the opening to supply path 22d, plug member 45 is placed into the opening.

Figure 7:
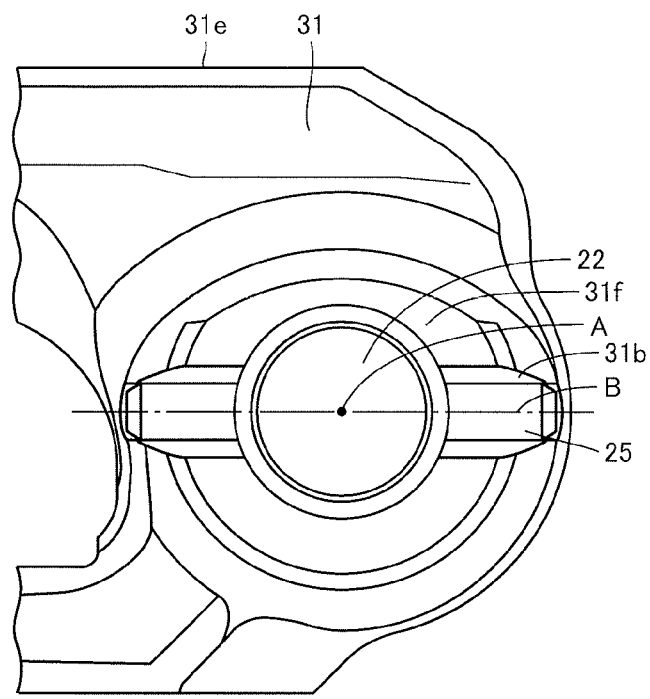
FIG. 7 is a front view schematically showing a state in which a locking pin is disposed in a groove of a second crawler belt link of the crawler belt coupling apparatus in one embodiment of the present invention.
Figure 8:
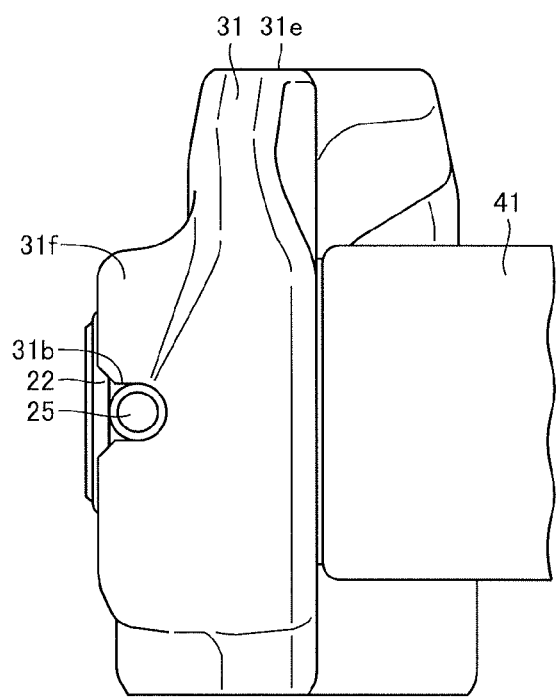
FIG. 8 is a side view schematically showing a state in which the locking pin is disposed in the groove of the second crawler belt link of the crawler belt coupling apparatus in one embodiment of the present invention.

Referring to FIG. 7 and FIG. 8, one (second crawler belt link 31) of the pair of crawler belt links into which master pin 22 is placed includes groove 31b in link boss portion 31f in parallel with the longitudinal direction of tread 31e. Master pin 22 is placed in second crawler belt link 31 such that insertion hole 22b thereof aligns with the above-described parallel groove 31b in one straight line. Locking pin 25 is press fitted into insertion hole 22b of master pin 22 via groove 31b. Both the end portions of locking pin 25 thus press fitted thereinto are contained in groove 31b.

Groove 31b has a width smaller than the diameter of master pin 22. Hence, when master pin 22 is rotated, locking pin 25 is locked by a side wall of groove 31b. Groove 31b is formed in parallel with tread 31e of second crawler belt link 31. With this shape, groove 31b can be provided with a longer length than that in the case where groove 31b is formed perpendicular to tread 31e. Groove 31b has a width equal to or larger than the diameter of locking pin 25. Locking pin 25 is disposed at the center of master pin 22. In other words, locking pin 25 is disposed such that center axis B of locking pin 25 overlaps with center axis A of master pin 22.

Groove 31b has an arc-like bottom surface in conformity with the cylindrical shape of locking pin 25. Groove 31b is tapered to have an opening area becoming larger toward the surface of link boss portion 31f. Such tapering may be short tapering attained by chamfering. Groove 31b has a depth larger in size than the diameter of locking pin 25.

Locking pin 25 is disposed in groove 31b. Locking pin 25 has a cylindrical shape, and is engaged with the arc-like bottom surface of groove 31b. Locking pin 25 is disposed at the center of groove 31b in the length direction. In other words, locking pin 25 does not project outwardly of groove 31b from both the ends of groove 31b in the length direction.

Figure 9:
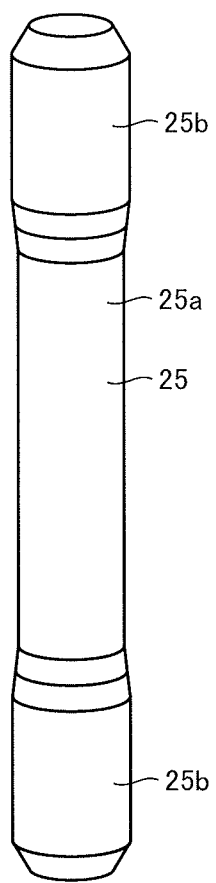
FIG. 9 is a perspective view schematically showing a structure of a modification of the locking pin in one embodiment of the present invention.

Referring to FIG. 9, in a modification of the locking pin of one embodiment of the present invention, center portion 25a of locking pin 25 has a diameter smaller than that of each of both side portions 25b sandwiching center portion 25a therebetween. Center portion 25a is set to have an outer diameter that provides intermediate fit with respect to the inner diameter of insertion hole 22b. Each of both side portions 25b is set to have an outer diameter that provides interference fit with respect to the inner diameter of insertion hole 22b. Locking pin 25 is press fitted into insertion hole 22b of master pin 22. When locking pin 25 is thus placed in master pin 22, center portion 25a of locking pin 25 is disposed in insertion hole 22b through intermediate fit. Both side portions 25b of locking pin 25 are disposed outwardly of insertion hole 22b. Locking pin 25 having such a shape is unlikely to fall off from master pin 22.

Figure 10:
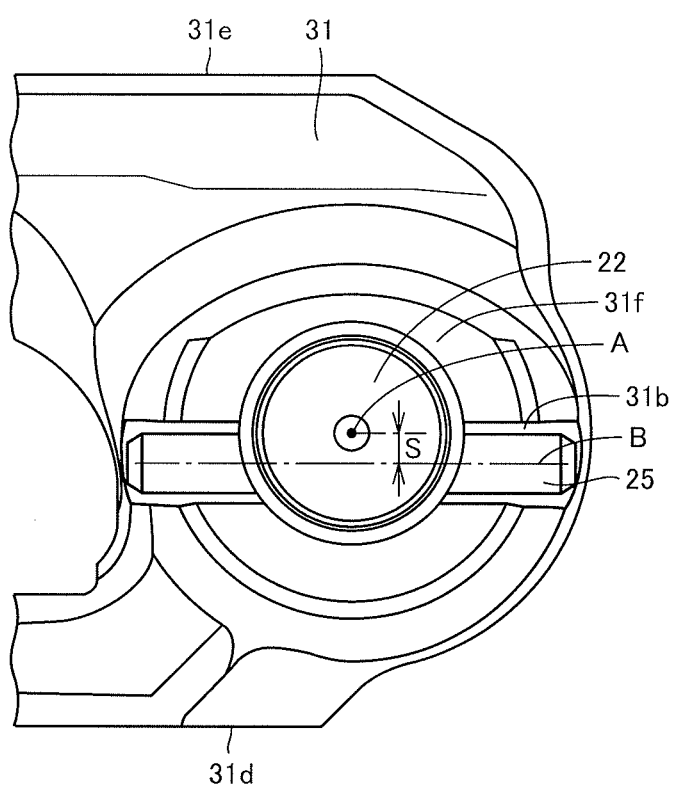
FIG. 10 is a perspective view schematically showing a structure of a modification of the crawler belt coupling apparatus in one embodiment of the present invention.

Referring to FIG. 10, in a modification of the crawler belt coupling apparatus of one embodiment of the present invention, locking pin 25 is displaced from the center of master pin 22 toward the track shoe plate mounting surface. In other words, center axis B of locking pin 25 is displaced by an offset amount S from center axis A of master pin 22 toward the track shoe plate mounting surface.

Although not shown in the figure, a plurality of locking pins 25 may be provided. For example, two locking pins 25 may be disposed to be displaced toward the track shoe plate mounting surface and the tread, respectively, from the center of master pin 22.

The following describes a manner of decoupling of the crawler belt coupling apparatus of the present embodiment.

Referring to FIG. 4 and FIG. 5 again, the decoupling of the crawler belt coupling apparatus of the present embodiment is attained by removing master pin 22 from first crawler belt link 21, second crawler belt link 31, and the one crawler belt link 20a adjacent to first crawler belt link 21 and second crawler belt link 31.

Master pin 22 is removed in the following procedure. First, the C-like-shaped cutout of each snap ring 26 is widened to remove snap ring 26 from circumferential groove 22c. Next, by pulling out snap ring 26 from the end portion of master pin 22, snap ring 26 is removed from master pin 22. In this state, master pin 22 is pulled out to the second crawler belt link side. In this way, the decoupling of the crawler belt coupling apparatus is attained.

Re-coupling of the crawler belt coupling apparatus can be attained in a procedure reverse to the above-described procedure. In other words, in the crawler belt coupling apparatus of the present embodiment, by detaching/attaching snap ring 26, first crawler belt link 21 and second crawler belt link 31 can be detached/attached from/to master pin 22. Thus, coupling and decoupling of crawler belt 10 can be performed without using a pressing machine, thereby achieving improved workability in detaching/attaching crawler belt 10.

The following describes function and effect of the crawler belt coupling apparatus of the present embodiment.

According to the crawler belt coupling apparatus of the present embodiment, snap ring 26 has the C-like shape, so that snap ring 26 can be readily detached/attached from/to master pin 22. By detaching/attaching snap ring 26, master pin 22 can be detached/attached from/to first and second crawler belt links 21, 31. Accordingly, master pin 22 can be detached/attached from/to first and second crawler belt links 21, 31 without using a pressing machine. In this way, workability can be improved in detaching/attaching crawler belt 10.

Further, locking pin 25 is press fitted into insertion hole 22b formed in master pin 22, and has both the ends projecting relative to master pin 22. Groove 31b is formed in the end surface of second crawler belt link 31 opposite to first crawler belt link 21, and has a width smaller than the diameter of master pin 22. Because locking pin 25 is disposed in groove 31b, locking pin 25 is brought into abutment with groove 31b when master pin 22 is rotated, thereby preventing rotation of master pin 22. In this way, master pin 22 can be prevented from being rotated about second crawler belt link 31. In this way, master pin 22 can be avoided from falling off from second crawler belt link 31.

Further, groove 31b has a width smaller than the diameter of master pin 22, so that link boss portion 31f of second crawler belt link 31 can be formed to be thick around groove 31b. This leads to suppression of wear of link boss portion 31f. In this way, master pin 22 can be prevented from being rotated about second crawler belt link 31.

Further, insertion hole 22b is not formed at the one end side of master pin 22, the one end side being the side in which snap ring 26 is placed. Hence, lubricating oil can be prevented from leaking due to insertion hole 22b communicating with supply path 22d of master pin 22.

Further, according to the crawler belt coupling apparatus of the present embodiment, master pin 22 is engaged with first and second through holes 21a, 31a through intermediate fit. Accordingly, master pin 22 can be detached/attached from/to first and second crawler belt links 21, 31 without using a pressing machine.

Further, in the crawler belt coupling apparatus of the present embodiment, locking pin 25 has a cylindrical shape and groove 31b has an arc-like bottom surface in conformity with the cylindrical shape. Accordingly, locking pin 25 can be in surface contact with the bottom surface of groove 31b. This suppresses groove 31b from being worn by contact with locking pin 25. In this way, master pin 22 can be avoided from falling off from second crawler belt link 31.

Further, in the crawler belt coupling apparatus of the present embodiment, center portion 25a of locking pin 25 has a diameter smaller than the diameter of each of both side portions 25b sandwiching center portion 25a therebetween. This reduces contact resistance between locking pin 25 and insertion hole 22b when press fitting it thereinto, thereby facilitating insertion of locking pin 25 into insertion hole 22b. Further, the outer diameter of locking pin 25 outwardly of insertion hole 22b can be larger than the inner diameter of insertion hole 22b when locking pin 25 is placed in insertion hole 22b. Hence, locking pin 25 can be prevented from being falling off from master pin 22.

Further, in the crawler belt coupling apparatus of the present embodiment, locking pin 25 is disposed at the center of groove 31b in the length direction. Accordingly, locking pin 25 can be unlikely to come off from both the sides of groove 31b in the length direction.

Figure 11:
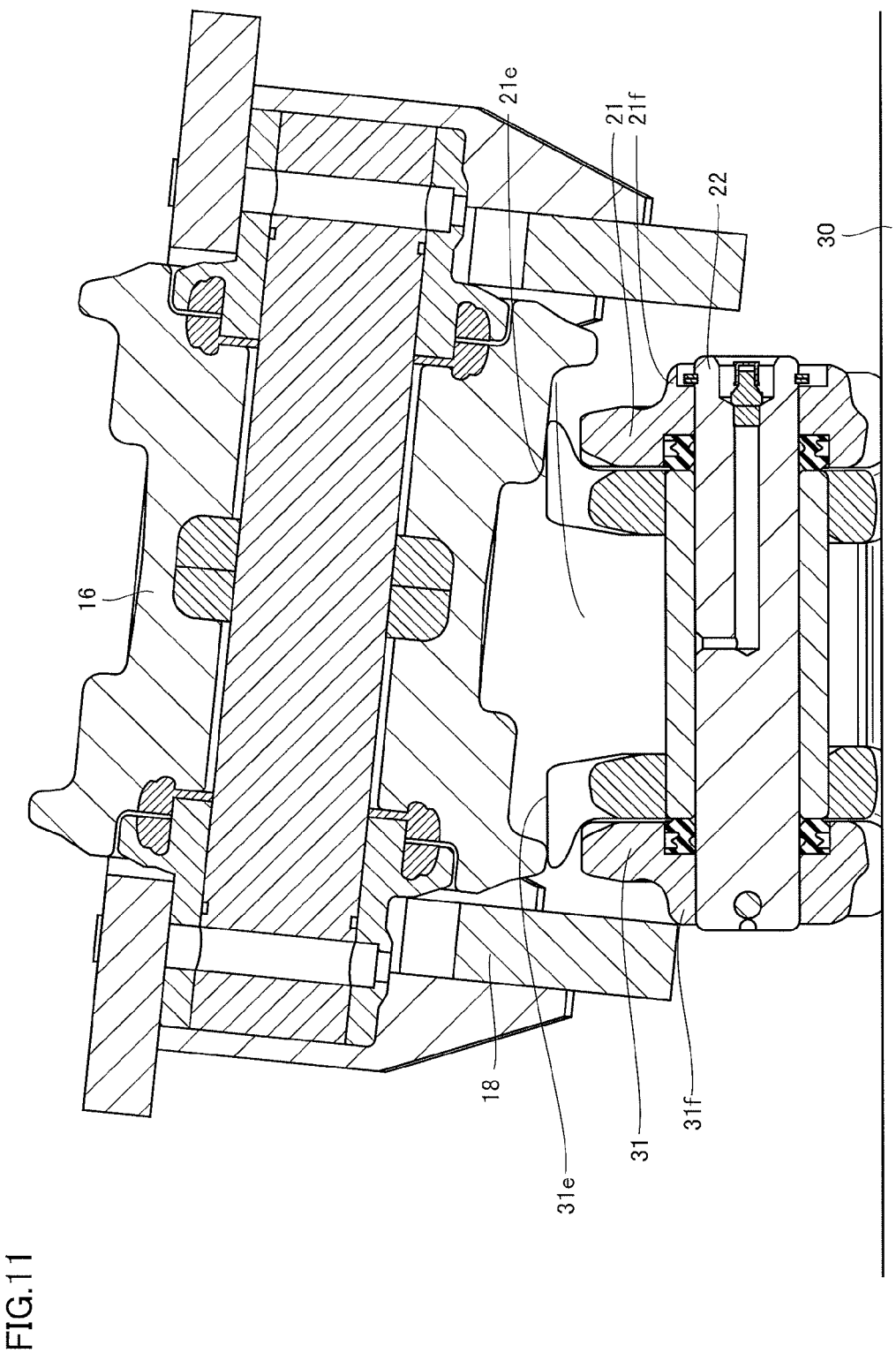
FIG. 11 is a cross sectional view schematically showing a manner of wear of a locking boss of a first crawler belt link of the crawler belt coupling apparatus in one embodiment of the present invention.

Further, referring to FIG. 11, in the crawler belt coupling apparatus of the present embodiment, when a guide 18 connected to track roller 16 is brought into contact with link boss portion 31f, link boss portion 31f may be cut in a direction perpendicular to tread 31e. Hence, if groove 31b is formed perpendicular to tread 31e, it is difficult for groove 31b to have a long length. In the crawler belt coupling apparatus of the present embodiment, groove 31b is formed in parallel with tread 31e, so that groove 31b can be provided with a long length. Accordingly, locking pin 25, which is disposed in the groove, can be also made long. In this way, there can be obtained a large area in which locking pin 25 and groove 31b are in abutment with each other, thereby further suppressing rotation of locking pin 25.

The embodiments disclosed herein are illustrative and non-restrictive in any respect. The scope of the present invention is defined by the terms of the claims, rather than the embodiments described above, and is intended to include any modifications within the scope and meaning equivalent to the terms of the claims.

INDUSTRIAL APPLICABILITY

The present invention can be particularly advantageously applied to a crawler belt coupling apparatus including a master pin.

REFERENCE SIGNS LIST

1: hydraulic excavator; 2: lower traveling unit; 3: upper revolving unit; 4: work implement; 5: cab; 6: engine compartment; 7: counter weight; 10: crawler belt; 11: revolving apparatus; 12: track frame; 13: idler tumbler; 14: driving wheel; 15: carrier roller; 16: track roller; 17: ladder for ascent/descent; 18: guide; 20: crawler belt link chain; 20a: crawler belt link; 21: first crawler belt link; 21a: first through hole; 21b: end surface; 21c: third through hole; 21d: track shoe plate mounting surface; 21e: tread; 21f: link boss portion; 22: master pin; 22a: outer circumferential surface; 22b: insertion hole; 22c: circumferential groove; 22d: supply path; 25: locking pin; 25a: center portion; 25b: both side portions; 26: snap ring; 30: track shoe plate; 31: second crawler belt link; 31a: second through hole; 31b: groove; 31c: fourth through hole; 31d: track shoe plate mounting surface; 31*e*: tread; 31*f* link boss portion; 34: crawler belt pin; 41: crawler belt bushing; 42: seal ring; 43: bolt; 44: nut; 45: plug member; A: center axis of master pin; B: center axis of locking pin.

The invention claimed is:

1. A crawler belt coupling apparatus comprising:
a first crawler belt link having a first through hole;
a second crawler belt link disposed to face said first crawler belt link, having a second through hole, and having a groove formed in an end surface thereof opposite to said first crawler belt link;
a master pin inserted into said first and second through holes, said master pin being provided with an insertion hole radially extending through said master pin;
a locking pin press fitted into said insertion hole and having both ends projecting relative to said master pin; and
a snap ring having a C-like shape, having an outer diameter larger than said first through hole, disposed opposite to said second crawler belt link relative to said first through hole, and attached to said master pin,
said groove having a radial width smaller than a diameter of said master pin,
said locking pin being disposed in said groove,
both ends of the locking pin being contained in the groove, and
the groove having a depth larger in size than a diameter of the locking pin.

2. The crawler belt coupling apparatus according to claim 1, wherein said master pin is engaged with said first and second through holes through intermediate fit.

3. The crawler belt coupling apparatus according to claim 1, wherein
said locking pin has a cylindrical shape, and
said groove has a semicircular bottom surface in conformity with said cylindrical shape.

4. The crawler belt coupling apparatus according to claim 1, wherein said locking pin has a center portion having a diameter smaller than a diameter of each of both side portions thereof sandwiching said center portion therebetween.

5. The crawler belt coupling apparatus according claim 1, wherein said locking pin is disposed at a center of said groove in a length direction.

6. The crawler belt coupling apparatus according to claim 1, wherein
said second crawler belt link includes a tread and a link boss portion, and
said groove is formed in said link boss portion in parallel with said tread.

* * * * *